United States Patent [19]

Kataoka et al.

[11] Patent Number: 4,484,807

[45] Date of Patent: Nov. 27, 1984

[54] FLASH LIGHT WITH PRE-EMISSION CONTROL

[75] Inventors: Hiroyuki Kataoka, Saitama; Masanori Yamada; Nobuyuki Suzuki, both of Kanagawa, all of Japan

[73] Assignee: Canon Kabushiki Kaisha, Tokyo, Japan

[21] Appl. No.: 452,875

[22] Filed: Dec. 27, 1982

[30] Foreign Application Priority Data

Jan. 6, 1982 [JP] Japan ................................ 57-804

[51] Int. Cl.³ .................... G03B 7/00; G03B 15/05
[52] U.S. Cl. ............................ 354/415; 354/421; 354/423
[58] Field of Search ................. 354/415, 421, 423

[56] References Cited

U.S. PATENT DOCUMENTS

| | | | |
|---|---|---|---|
| 3,913,111 | 10/1975 | Tokutomi | 354/415 |
| 4,256,995 | 3/1981 | Ishida | 354/415 |
| 4,305,647 | 12/1981 | Ishida | 354/415 |
| 4,327,978 | 5/1982 | Ishida et al. | 354/415 |

*Primary Examiner*—Russell E. Adams

*Attorney, Agent, or Firm*—Toren, McGeady and Stanger

[57] ABSTRACT

A flash photographing device of the type which detects the distance up to an object by a preliminary flash emission so as to control the diaphragm according to the detailed object distance, while the light adjusting level of the light adjusting speed light device is set according to the detected object distance. In the case of a flash photographing device of this type, a proper exposure can be guaranteed when a detected object distance is within the range of the operational engagement of a light adjusting circuit, while the exposure is improper when the distance is beyond the range. The arrangement of the present invention provides a flash photographing device of the above-described type which controls the diaphragm at the smallest aperture value of the lens independently of the value of a detected object distance when the detected object distance is beyond the range of operative engagement. By setting the light adjusting level at the highest or lowest level, a proper exposure can be obtained even when the detected object distance is beyond the range of operative engagement.

9 Claims, 8 Drawing Figures

FLASH LIGHT WITH PRE-EMISSION CONTROL

BACKGROUND OF THE INVENTION

1. Field of the Invention

The present invention relates to a flash photographing device which measures the quantity of a preliminary flash emission reflected from an object so as to set an adjusting level of the flash light quantity control circuit according to the results of the light measurement and to control diaphragm in order to carry out the flash photographing.

2. Description of the Prior Art

Until now, as is disclosed for example in Japanese Patent Publication No. Sho 50-133831, the flash photographing device of this type, which carries out the preliminary flash emission before the flash photographing, measures the quantity of the light reflected from the object, sets the light adjusting level according to the obtained object distance information, and controls the diaphragm according to the light adjusting level.

Consequently, where the object is in the range of the variation of the above light adjusting level, namely in the range of the operative engagement with the distance, it is possible to obtain a proper exposure, while it is impossible to obtain it when the object is at such a long or a short distance as beyond the above range.

SUMMARY OF THE INVENTION

It is, accordingly, an object of the present invention to provide a flash photographing device of the above type so designed that when the object distance detected by the preliminary flash emission is at such a short distance beyond the range of the operative engagement, the diaphragm is set at the largest aperture value of the lens, while the light adjusting level is set at the value for the smallest quantity of the flash emission so as to obtain as proper an exposure of a very near object as possible.

It is another object of the present invention to a flash photographing device of the above type so designed that when the object distance detected by the preliminary flash emission is at such a long distance as beyond the range of the operative engagement, the diaphragm of the lens is set at the smallest aperture value, while the light adjusting level is set at the value for the largest quantity of the flash emission so as to obtain as proper an exposure of a very distant object as possible.

Further objects and features of the present invention will be apparent from the description made herein below with reference to the accompanying drawings of embodiments hereof.

DESCRIPTION OF THE PREFERRED EMBODIMENTS

Below, the present invention will be described with reference to the accompanying drawings of an embodiment hereof.

Figure 1:
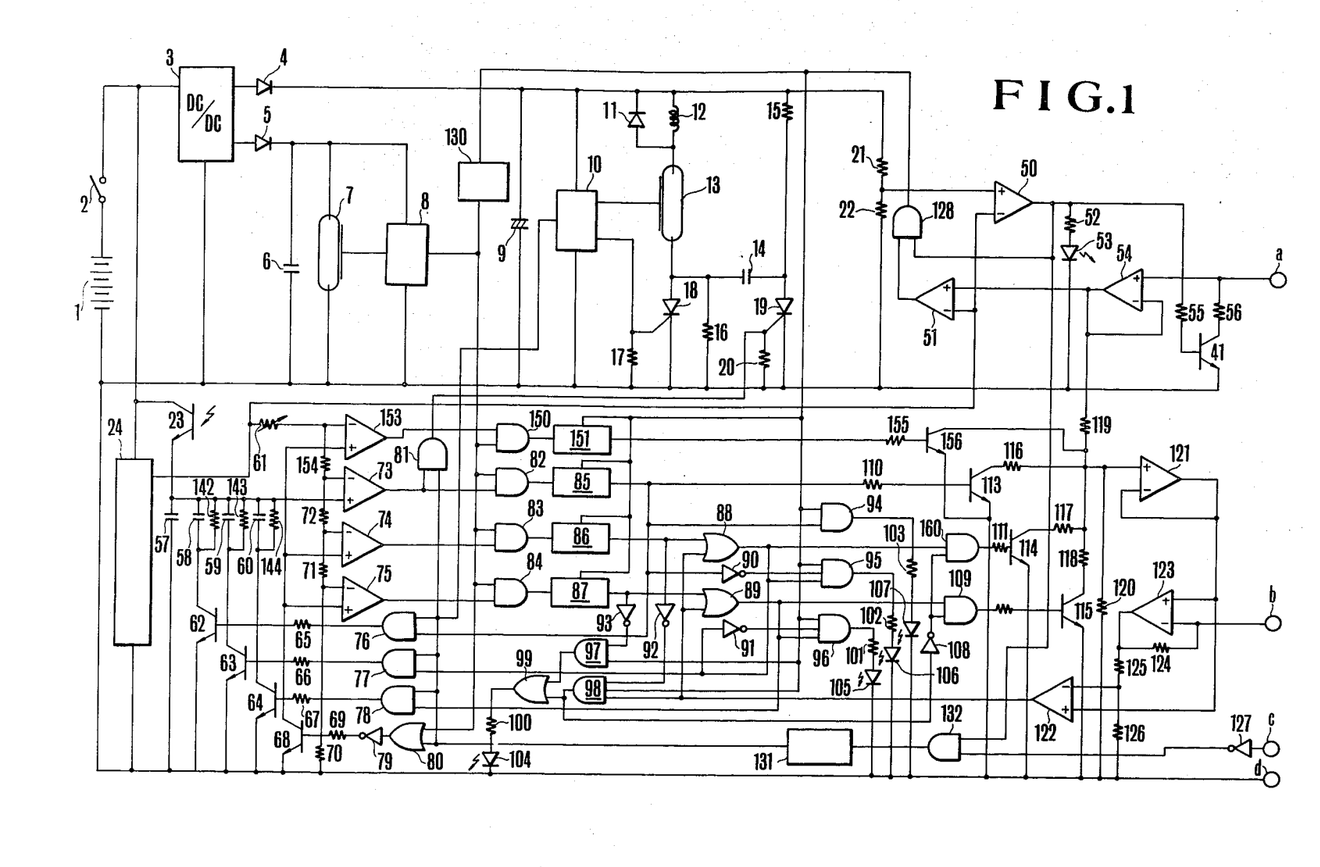
FIG. 1 shows the circuit of an embodiment of the speed device in the flash light photographing device of the present invention.

FIG. 1 shows a circuit of the automatic speed light in the flash photographing device of the present invention. In the drawing 2 is the normally opened power source switch connected in series with the battery 1, whereby a conventional DC-DC converter 3 for stepping up the voltage of the battery 1 is connected to the switch 2. Two rectifying diodes 4 and 5 are connected to the converter 3. The anode of the main thyristor 18 is connected via the coil 12 and the photographing main discharge tube 13 to the cathode of the diode 4. Further, to the cathode of the diode 5, a parallel circuit consisting of the distance measuring auxiliary discharge tube 7 and the auxiliary capacitor 6 for supplying light emitting energy to the discharge tube 7 is connected. To the trigger electrode of the above auxiliary discharge tube 7, the trigger circuit 8 is connected and to the input terminal of the trigger circuit 8, the monostable multivibrator 130 is connected. The main capacitor 9 for storing the light emitting energy is connected in parallel to the above main discharge tube 13, to whose trigger electrode the conventional trigger circuit 10 is connected. On the other side, the second output terminal of the trigger circuit 10 is connected to the gate of the main thyristor 18 and the resistance connected to the gate. Elements 15 and 16 are the resistances for constituting the charge circuit of the commutating capacitor 14, whereby the resistance 15 is also connected to the anode of the auxiliary thyristor 19 for interrupting the main thyristor. Element 20 is the resistance connected to the gate of the auxiliary thyristor 19, 21 and 22, the voltage dividing resistances connected in parallel to the main capacitor 9, so as to detect the charge voltage of the main capacitor 9, and 23, the photo transistor for sensing the light reflected from the object (not shown in the drawing), whereby the constant voltage source 24 and the distance measuring capacitor 57 are connected to the phototransistor 23. Element 50 is the comparator connected to the output terminal of the above voltage dividing circuit 21, 22, whereby the negative input terminal (−) of the comparator 50 and that (−) of the comparator 51 are connected to the output terminal of the constant voltage source so as to be supplied with the standard voltage. Element 53 is the light emitting diode (hereinafter called LED) connected to the output terminal of the comparator 50 via the resistance 52 so as to display the charge completion of the main capacitor 9, 54 the buffer circuit connected to the terminal to be connected to the terminal at the camera side to be explained later, whereby the output terminal of the circuit 54 is connected to the positive input terminal (+) of the comparator 51 for detecting whether the shutter release button to be explained later, is depressed down to the position of the first stroke. Element 41 is the npn transistor connected to the terminal a via the resistance 56, whereby the base of the transistor 41 is connected to the output terminal of the comparator 50 via the resistance 55 and the emitter is connected to the negative electrode of the battery 1. The element 58 connected in series to the switching transistor 62 is the capacitor forming part of the first time constant circuit of the light measuring circuit in the flash light quantity control circuit; the element connected in series to the switching transistor 63 is the second capacitor forming part of the second time constant circuit of the light measuring circuit in the flash light quantity control circuit; the element 60 connected in series to the switching transistor 64 is the third capacitor forming part of the third time constant circuit of the light measuring circuit in the flash light quantity control circuit. To these capacitors 58–60, the high discharge resistances 142, 143 and 144 are respectively connected so as to form light adjusting integrating circuits. Elements 65, 66 and 67 are the base resistances respectively connected to the base of the transistors 62, 63 and 64; element 68 is the npn transistor to be inverted into the non-conductive state at the same time as the start of the light emission so as to start the operation of the light measuring circuit at the same time as the start of the preliminary and the main flash light emission; element 69 is the resistance connected to the base of the transistor 68, elements 73, 74, 75 and 153 are the comparators for selecting the light adjusting level, namely the aperture value to be used; elements 70, 71, 72 and 154 are the standard voltage supplying resistances connected to the comparators 73–75 and 153; element 61 is the resistance whose value is varied in accordance with the film sensitivity to be set; elements 76–78 form the AND gate connected respectively to the base of the transistor 62–64 via the resistances 65–67 so as to bring one of the transistors 62–64 in the conductive state in synchronization with the growth of the flash light emission trigger signal to be explained later; element 80 is the OR gate connected to the base of the switching transistor 68 via the resistance 69; element 81 is the AND gate connected between the comparator 73 and the auxiliary thyristor 19 so as to lead the flash light emission stop signal from the comparator 73 to the gate of the auxiliary thyristor 19; elements 82–84 and 150 form the AND gates for leading the light adjusting level selection signal, namely the aperture value selection signal from the comparators 73–75 and 153 to the latch circuits 85–87 and 151, whereby the output terminal of the gate 82 is connected to the gate of the thyristor constituting the latch circuit 85, the output terminal of the gate 83 to the gate of the thyristor constituting the latch circuit 86 and the output terminal of the gate 84 to the gate of the thyristor constituting the latch circuit 87. Elements 85–87 and 151 are the above latch circuits respectively consisting of a thyristor whereby the anode of the thyristor constituting the latch circuit 151 is connected to the output of the AND gate 128, while the cathode is connected to the base of the transistor 156 via the resistance 155. The anode of the thyristor constituting the latch circuit 85 is connected to the output of the AND gate 128, while the cathode is connected to the base of the transistor 113 via the resistance 110. The anode of the thyristor constituting the latch circuit 86 is connected to the output terminal of the AND gate 128, while the cathode is connected to the base of the transistor 114 via the OR gate 88, the AND gate 160 and the resistance 111. Further, the anode of the thyristor constituting the latch circuit 87 is connected to the output terminal of the AND gate 128, while the cathode is connected to the OR gate 89. Elements 90–93 are the inverters and 105–107 form the LED connected to the AND gates 94–96 via the resistances 101–103 so as to display the selected light adjusting level, namely the aperture value before the main flash light emission. Element 108 is the inverter connected to the AND gates 109 and 160, 110–112 the base resistances connected to the base of the npn transistors 113–115, elements 116–118 are the resistances for producing the voltage corresponding to the selected aperture value, elements 119 and 120 are the resistances for the voltage dividing circuit respectively connected in parallel to the resistances and element 121 is a buffer circuit connected to the connecting point of the above resistances 119 and 120 for dividing the output voltage of the above buffer circuit 54 so as to deliver the non-inverted input terminal voltage from the output. Element 122 is the comparator for judging the smallest aperture F signal of the lens delivered from the camera side via the terminal b, elements 125 and 126 form the voltage dividing circuit constituting resistances for delivering the standard voltage to the negative input terminal of the comparator 122 and element 123 is the operational amplifier whose non-inverting input terminal is connected to the output terminal of the above buffer circuit 121 and between whose output terminal and inverting input terminal the resistance 124 is connected, whereby at the inverting input terminal the voltage at the non-inverting input terminal itself appears.

The comparator 122, the bleeder resistances 125 and 126 and the amplifier 123 constitute the detecting circuit for detecting the FNo information of the lens at the camera side. The above terminal b is connected to the FNo information source at the camera side, whereby the detecting circuit is designed so as to detect the FNo information of the lens by detecting the value of the impedance Z of the FNo. information source, whereby the comparator delivers the low level (LL) when the FNo. of the lens is smaller than the appointed aperture value, while it deliver the high level (HL) when the FNo. of the lens is larger.

Element 127 is the inverter connected to the synchronization terminal c for flash light emission trigger signal and the input terminal of the AND gate 132; element 131 is the mono stable multi vibrator (hereinafter called one shot circuit) connected to the OR gate 80; elements 97 and 98 form an AND gate and element 104 is the under exposure alarm LED connected to the OR gate 99 via the current limit resistance 100.

The above terminal a is supplied with a constant voltage from the camera side when the release button of the camera is depressed down to the position of the first stroke and delivers the shutter time change over signal to the camera side when the main condenser has been charged, while the above terminal b delivers the voltage corresponding to the selected aperture value from the speed light device to the camera side and the smallest aperture value signal of the photographing lens from the camera side to the processing circuit of the speed light device. At the terminal b, a voltage almost equal to the ground potential when the transistor 156 is closed takes place. c is the conventional synchronization terminal, while d is the ground terminal.

For the sake of the easy comprehension of the present invention, the operation of the automatic speed light device will be explained with reference to FIGS. 1 to 3 before that of the flash light photographing device.

Figure 2A:
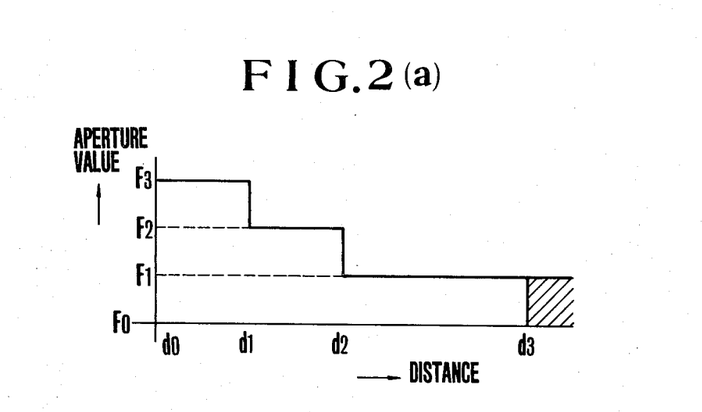
FIGS. 2(a) and (B) and FIGS. 3(a)-(c) illustrate the operation of the speed light device in FIG. 1.
Figure 2B:
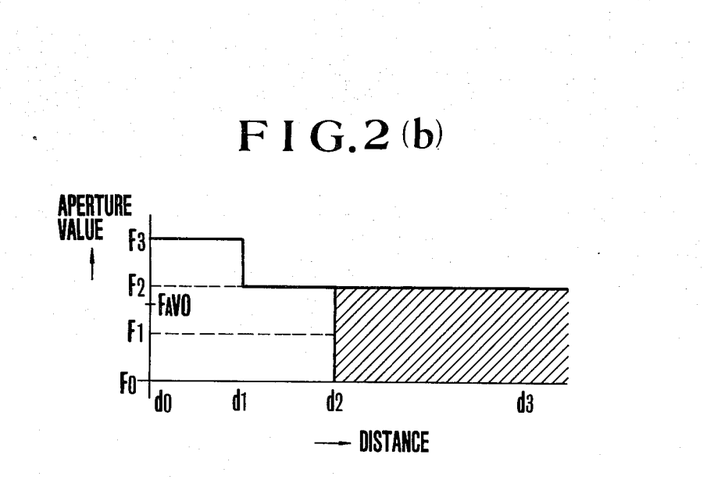

FIG. 2 shows the relation between the distance between the speed light device and the object and the photographing aperture value to be selected, whereby FIG. 2(a) shows the case when a comparatively bright lens is used, while FIG. 2(b) shows the case when a comparatively dark lens is used.

As shown, the horizontal axis shows the distance, while the vertical axis shows the aperture value.

Figure 3A:
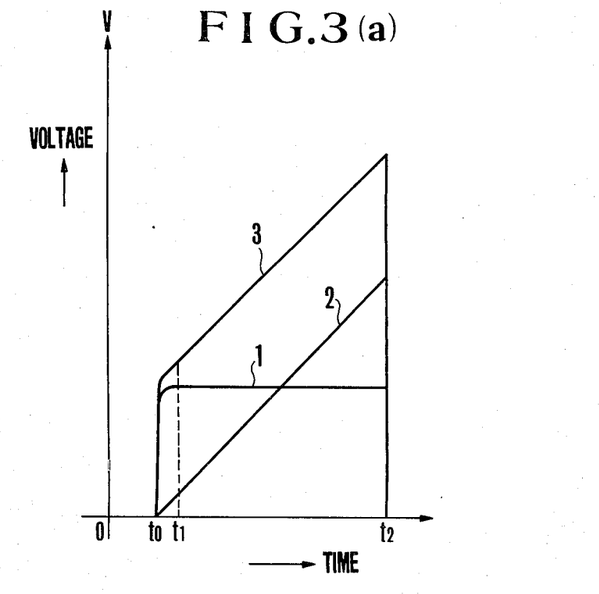
Figure 3B:
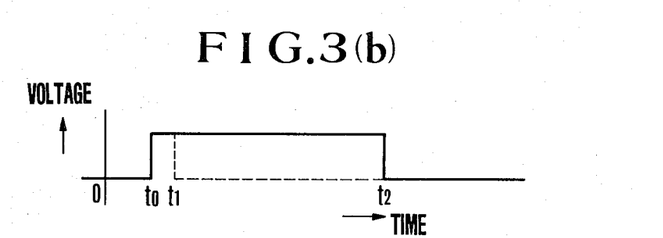
Figure 3C:
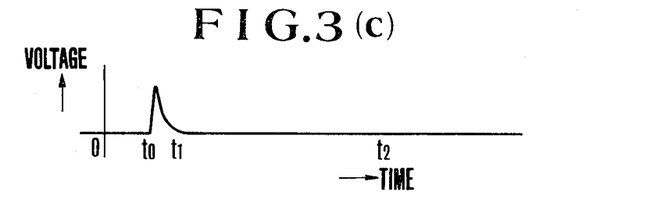

Further, FIG. 3(a) shows the charge voltage characteristics of the distance measuring capacitor 57, whereby the horizontal axis shows the time, while the vertical axis shows the charge voltage. FIG. 3(b) shows the output wave form of the one shot circuit. Here the time t1–t2 is, for example, several 10 $\mu$s. FIG. 3(c) shows the charge characteristics of the auxiliary discharge tube. Here, the discharge time t0-t1 is for example 10 μs. In FIG. 3(c), 1 shows the change of the charge voltage of the capacitor 57 when the light measuring time is several 10 μs, the brightness of the light on the object is low and the distance up to the object is medium, 2 shows that when the light measuring time is also several 10 μs, the distance up to the object is large and the brightness of the light is high and 3 shows that when the light measuring time is also several 10 μs, the distance up to the object is medium and the brightness of the light is high. The comparison between the wave form 1 and that 3 shows that where the light measuring time is about 10 μs, the charge voltage change of the capacitor 57 is influenced only by the flash light reflected from the object shown in FIG. 3(c), namely the reflection factor component and the distance component of the object, and since the light measuring time is longer, the light from the background gives larger influence. Consequently, by changing the light measuring time, namely the width of the one shot pulse, in the case of 3 in FIG. 3(a), to be explained later, the aperture value is set in accordance with the distance up to the object, the reflection factor component and the background light component so as to adjust the main speed light in order to obtain a proper exposure not only for the speed light but also for the daylight. This is particularly effective for the back light.

Firstly, explanation will be made when the photographing lens is bright. In this case, as is explained later, the impedance of the FNo. information source is detected and the comparator produces the LL.

Figure 5:
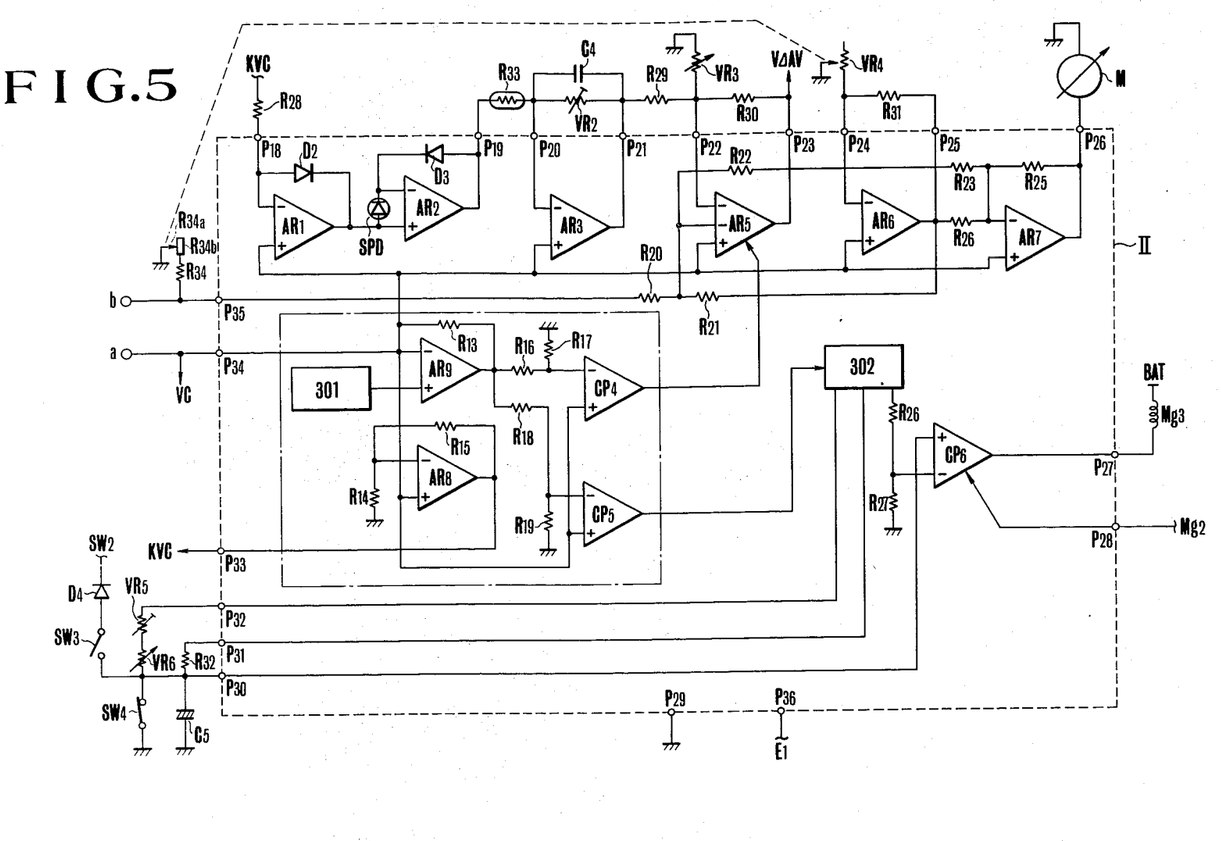

Now, let the value of the resistance 125 be R1, that of 126 be R2, that of 124 be R3, the impedance between the terminal b in FIG. 5 and ground be Z, the voltage at the b terminal at the speed light device be $V_{AV}$, the output of the amplifier 123 be $V_{OUT}$ and the potential between the resistances 125 and 126 be Vr.

Then, $$Vr = V_{OUT}\frac{R2}{R1+R2} \quad V_{OUT} = V_{AV}\left(1 + \frac{R3}{Z}\right)$$

Because the condition that the comparator 122 delivers the LL is $Vr > V_{AV}$, $$V_{AV}\left(\frac{R2}{R1+R2}\right)\left(1 + \frac{R3}{Z}\right) > V_{AV}$$

so that Z<R3R2/R1=C.

Namely, when Z<R2R3/R1, the lens is bright, while Z>R2R3/R1, the lens is dark.

In the following explanation, the photographing lens is bright, the output of the comparator 122 LL, the output of the AND gate 98 also LL and the output of the inverter 108 HL.

When the power source switch 2 is closed after the automatic speed light in FIG. 1 is mounted on the hot shoe (not shown in the drawing) of the camera, the DC-DC converter 3 and the constant voltage source 24 start to operate, whereby the main capacitor 9, the auxiliary capacitor 6 and so on start to be charged. When the charge voltage of the main capacitor 9 reaches a certain determined value and the output level of the comparator 50 is inverted from LL to HL, the LED 53 is lit so as to display that the main capacitor 9 has been charged, while a high level voltage is applied to the base of the transistor 41 so as to invert the transistor 41 into the conductive state.

When then the photographer depresses the shutter release button (not shown in the drawing) down to the position of the first stroke (at which position the shutter release or the aperture adjusting operation is not started as will be described later and only the light measuring circuit and the display circuit in the camera start to operate), a constant voltage is applied to the terminal a via the hot shoe of the camera so as to invert the transistor 41 into the conductive state in such a manner that the shutter time change-over signal is delivered to the camera side as will be described later. This is done to change over the mode of the shutter time control circuit from the daylight photographing mode into the flash light photographing mode. Further, the constant voltage produced at the terminal is also applied to the positive input terminal (+) of the comparator 51 so that the output level of the comparator 51 is inverted from LL to HL and the one shot circuit 130 is triggered so as to produce the HL output voltage for a certain predetermined time t0-t2, for example several 10 μs. Consequently, at the same time when the one shot circuit 130 produces a pulse, the trigger circuit 8 is triggered and, at its output terminal, a trigger pulse for triggering the auxiliary tube 8 takes place. Because at this time the auxiliary capacitor 6 has been charged up to a sufficiently high voltage, when the trigger pulse is delivered from the trigger circuit 8, a current flows from the capacitor 6 to the auxiliary discharge tube 7 which starts the preliminary light emission.

Because, on the other hand, the pulse from the one shot circuit 130 is delivered also to the AND gates 82-84 and the OR gate 80, the AND gates 82-84 are brought in the waiting state, while the transistor 68 becomes non-conductive via the inverter 79 and the resistance 69, whereby the short circuit of the distance measuring capacitor 57 is released and the light measurement circuit for distance measurement starts to operate at the same time with the start of the above preliminary light emission. Further, because at this time no LL light emission trigger signal is applied to the synchronization terminal c, the one shot circuit 131 does not operate and the gate of the AND circuits 76-78 are closed. Consequently, all of the transistors 62-64 remain in the non-conductive state and all of the light adjusting capacitors 58-60 remains in the non-operative state. Namely, only integrating capacitor 57 is operating is only 57.

When the light of the discharge tube 7 reflected from the object is incident upon the phototransistor 23, the output voltage of the distance measuring capacitor 57 goes up along with the lapse of the time in accordance with the photo current flowing through the photo transistor 23. The charge voltage of the capacitor 57 goes up as is shown in FIG. 3(a) in accordance with the strength of the daylight illuminating the object and the background even after the stop of the light emission of the discharge tube 7.

The charge voltage of the capacitor 57 during the distance measuring process is latched as the distance information by the latch circuit 85-87 and 151 when the output level of the one shot circuit 130 is inverted into LL after the lapse of about several 10 μs after the start of the preliminary light emission. In the event that the distance up to the object is in the range d2(m)-d3(m) (long distance) in FIG. 2(a) and only the comparator 75 is HL due to the charge voltage of the capacitor 57, only the output level of the latch circuit 87 is HL so that the output level at the output terminals of the OR gate 89, and the AND gate 109 is HL and only the transistor 115 is conductive so as to connect the resistance 118 in parallel to the resistance 120. Because, at this time, a constant voltage is applied from the terminal a to the resistance 119 and 120 via the buffer circuit 54, when the resistance 118 is connected in parallel to the resistance 120 so as to set the aperture value, for example, at F2.0, the potential at the positive input terminal of the buffer circuit 121 goes down in accordance with the value of the resistance 118 connected in parallel and the potential at the non-inverting input terminal of the amplifier 123 also goes down. As a result, at the terminal b, a voltage for setting the aperture value of the photographing lens at F1 takes place.

Further, when the OR gate 89 is HL as described above, the AND gate 78 and the transistor 64 are HL respectively in the conductive state. Namely, the above aperture value F1 can be set in the flash light quantity control circuit of the automatic speed light device and the light adjusting level is set so as to assume the value corresponding to the aperture value of F1.

Further, when the OR gate 89 is HL as described above, the output of the AND gate 128 is HL and that of the latch circuit 86 is LL so that the output of the AND gate 96 is also HL and the LED is lit, so as to display that the aperture of the photographing lens and the light adjusting level of the speed light device are set at the above value F2.

On the other hand, when the distance up to the object is in the range of d2( m)-d1(m) in FIG. 2(a) and the output of the comparators 75 and 74 is HL due to the charge voltage of the capacitor 57, the output of the latch circuits 86 and 87 is HL so that the output of the AND gate 160 and 109 is HL via the OR gate 88 and 89 and the transistors 114 and 115 become conductive so as to connect the aperture value setting resistances 117 and 118 in parallel to the resistance 120, in the voltage dividing circuit. When the resistances 117 and 118 are connected in parallel to the resistance 120 the potential at the positive input terminal of the buffer circuit 121 goes down in accordance with the value of the resistances 117 and 118 connected in parallel to the resistance 120, while the potential at the non-inverting input terminal of the amplifier 123 also goes down accordingly.

As the result, at a terminal, voltage of the value for setting the aperture of the photographing lens at a value F2 (FIG. 2(a)) for example, F4.0 larger than the previous value F1 (FIG. 2(a)) takes place. Further, when the OR gates 88 and 89 are HL as described above, the one input terminal of the AND gates 77 and 78 is HL so that each of the transistors 63 and 64 can be brought into the conductive state. Namely, the above described aperture value F2 can be set in the flash light quantity control circuit of the automatic speed light device.

Further, when the OR gates 88 and 89 are inverted into HL as described above, the output of the AND gate 128 is HL and that of the latch circuit 85 is LL so that the output of only the AND gate 95 out of the gates 94–96 is HL and the LED106 is lit so as to display that the aperture of the photographing lens and the light adjusting level of the speed light device set at the above described aperture value F2.

When the distance up to the object is in the range of d1(m)-d0(m) (short distance) and the object is in the light adjustable range the output of the comparators 75, 74 and 73 is HL due to the charge voltage of the capacitor 57 and only the output of the comparator 153 is LL. Consequently, the output of the latch circuit 85–87 is HL so that the output of the OR gates 88–89 and the AND gates 109 and 160 is HL, whereby the transistors 113–115 become conductive so as to connect the aperture value setting resistances 116, 117 and 118 in parallel to the resistance 120 of the voltage dividing circuit. When the resistances 116–118 are connected in parallel to the resistance 120, the potential at the positive input terminal of the buffer circuit 121 goes down according to the value of the resistances 116–118 connected in parallel to the resistance 120, while the potential at the non-inverting input terminal of the amplifier 123 also goes down.

As a result, at the terminal b, a voltage which sets the diaphragm of the photographing lens at an aperture value F3 (FIG. 2(a)) such as F8.0 which is larger than the above described value F2 (FIG. 2(a)) takes place.

Further, when the output of the latch circuit 85 is HL and that of the OR gates 88 and 89 is HL, one input terminal of each of the AND gates 76, 77 and 78 is HL so that the transistors 62–64 are in a position to be conductive. Namely, the above described aperture value F3 is in a position to be set in the flash light quantity control circuit of the automatic speed light device, whereby the light adjusting level is also set at a value corresponding to F3.

When further the output of the latch circuit 85 is HL, because the output of the AND gate 128 is HL only the LED 107 is lit so as to display that the diaphragm of the photographing lens and the light adjusting level of the speed light device are set at the above described aperture value F3.

Because at this time the output of the latch circuit 85 is HL as described above, the output of the inverter 90 is LL. Consequently, the output of the AND gate 95 is LL and the LED 106 is not lit.

Further, at this time the output of the latch circuit 86 is HL as described above so that the output of the OR gate 88 is HL, while that of the inverter 91 is LL. Consequently, the output of the gate 96 is LL and the LED 105 is not lit.

When the object distance is shorter than the range of d1(m)-d0(m) in FIG. 2(a), namely at a position at which the light adjusting is impossible, the charge voltage of the capacitor 57 becomes remarkably high. Because the comparator 153 is set so as to be HL at this time, the latch circuit 151 becomes HL, whereby the transistor 156 becomes conductive and the terminal b is at the ground potential via the amplifiers 121 and 123. When the terminal b is 0V the diaphragm is set at the largest F-value for example F16 or F22. The transistors 62–64 close and also the light adjusting level is set at HL.

When the object distance is longer than d3 (FIG. 2(a)) and none of the comparators 73–75 and 153 is inverted into HL even when the several 10 μs determined by the output of the one shot circuit 130 has elapsed, namely the object is at a position at which the light adjusting is impossible, the transistor 113 remains in the non-conductive state because the output of the latch circuit 85 is LL. Further, at this time the output of the AND gates 160 and 109 are LL because that of the latch circuits 86, 87 is LL. Consequently, when the object is in the above described state all of the transistors 113–115 for determining the aperture value of the photographing lens remain in the non-conductive state and the transistor 156 is opened so that the amplifier 123 delivers a voltage corresponding to the smallest value F0 determined by the voltage dividing ratio of the voltage dividing circuit 119 and 120 (FIG. 2(a)), for example F1.0 to the diaphragm control circuit at the camera side via the terminal b so as to compulsorily set the diaphragm at the smallest F value. Further, the light adjusting level is set at the lowest because the transistors 62-64 are opened. Further, because at this time the output of the latch circuit 87 is LL and that of the AND gate 97 is HL, the LED 104 is lit so as to display that the object is beyond the range of the flash light photographing.

When the shutter release button is again depressed down to the position after the once depressed shutter release button is released, a certain determined constant voltage is applied from the camera side to the terminal a. When, at this time, the main capacitor 9 has been charged, the preliminary light emission is carried out again and the above described distance measurement is carried out again.

Below, the case where the lens darker than F1, for example F2.8-4.0 is mounted on the camera (not shown in the drawing) will be explained.

Because in this case the appointed aperture value of the speed light device is smaller than the smallest aperture value of the lens, there is a possibility for under exposure if the flash light emission is controlled by the appointed bright aperture value. Consequently, when the dark lens is used, the flash light emission is controlled so as to avoid the under exposure within the range of the smallest aperture value of the dark lens.

When such a lens is mounted on the camera, because the potential at the positive input terminal (+) of the comparator 122 is higher than that at the negative input terminal, the output of the comparator 122 is HL, while the output of the OR gates 88 and 89 is compulsorily HL. Thus, let us suppose that the impedance is set so as to be larger than $$\frac{R2 - R3}{R1} \left( Z > \frac{R2 - R3}{R1} \right)$$

by the lens darker than F1.

When then, after the main capacitor 9 has been charged, the above described shutter release button (not shown in the drawing) is depressed down to the position of the first stroke, in the same way as the above described case the one shot circuit 30 is triggered so as to produce HL signal for several 10 μs, the transistor 68 is inverted in the non-conductive state as described above and the light measuring circuit for distance measurement is brought in the operative state.

On the other hand, when the one shot circuit 130 produces the HL signal, the discharge tube 7 emits a flash so as to carry out the preliminary flash emission as described above.

When none of the comparators 73-75 is inverted into HL even when several 10 μs determined by the output of the one shot circuit 130 have elapsed because the object distance is longer than d3(FIG. 2(b)), the LED 104 is lit so as to display that the object is beyond the flash light photographing range.

Because the output of the OR gates 88 and 89 is compulsorily HL due to the HL output of the comparator 122 when the object is in the above described state, HL is delivered to the one input terminal of each of the AND gates 77 and 78 so that the transistors 63 and 64 are in a position to be conductive. Namely, the capacitors 59 and 60 of the light measuring circuit of the flash light quantity control circuit (hereinafter called light adjusting circuit) have been selected with the result that the light adjusting level is in a position to select a comparatively dark aperture value F2. Consequently, when the lens whose smallest FNo. is between F1 and F2 for example $F_{AVO}$ in FIG. 2(b) is used the light adjusting level of the flash light quantity control circuit is set at F2 near the smallest FNo. Further, due to the LL output of the latch circuit 86, the output of the AND gate 98 is HL, the transistors 114 and 115 are in the non-conductive state (hereby the transistors 156 and 113 are opened) and the aperture value setting resistances 119 and 120 are selected, so that at the terminal b a voltage for setting the aperture value of the photographing lens at F0 takes place so as to compulsorily set the lens at the smallest aperture value.

When then the object distance is between d2-d3 (FIG. 2(b)) and only the output of the comparator 78 is HL, the output of the latch circuits 85 and 151 is LL so that the transistors 113 and 156 remain in the non-conductive state as described above. Further, because the output of the AND gate 98 is also HL, the transistors 114 and 115 remain in the non-conductive state also in this case. Consequently, also in this case, the amplifier 123 delivers a voltage corresponding to the aperture value F0 determined by the voltage dividing ratio of the voltage dividing circuit 119 and 120 to the camera side via the terminal b. Further, also in this case, the light measuring circuit of the light adjusting circuit is in a position to select the aperture value. Consequently, in this case the diaphragm is set at the smallest aperture value of $F_{AVO}$, while the light adjusting level is set at F2 almost corresponding to $F_{AVO}$.

Further, when the object distance is between d1-d2 (FIG. 2(b)) and only the output of the comparators 74 and 75 is inverted into HL, the transistors 113 and 156 remain in the non-conductive state in the same way as in the above described case. On the other hand, because the output of the latch circuit 86 is inverted into HL due to the HL output of the comparator 74, the output of the inverter 92 is LL and that of the AND gate 98 is LL so that the output of the inverter 108 is HL. Consequently, because the output of the latch circuit 86 is HL the output of the AND gate 160 is HL so that the transistor 114 becomes conductive, while the resistance 117 is connected in parallel with the resistance 120. Further, because the output of the latch circuit 87 is HL, the output of the AND gate 109 is also HL so that the transistor 115 becomes conductive, while the resistance 118 is connected in parallel to the resistance 120. Thus, the amplifier 123 delivers a voltage corresponding to the aperture value F2 determined by the voltage dividing ratio of the voltage dividing circuits 117, 118, 119 and 120 to the camera side via the terminal b. On the other hand, because the output of the latch circuits 86 and 87 is HL, the LED 104 is extinguished so as to display that the flash light photographing can be carried out under proper exposure. Further, the latch circuits 86 and 87 deliver the HL outputs so that the OR gates 88 and 89 deliver the HL outputs, whereby the light measuring circuit of the light adjusting circuit is in a position to select the aperture value of F2.

When then the object distance is between d0-d1 (FIG. 2(b)) all the comparators 73-75 except 153 are converted into HL, due to the HL output of the latch circuit 86 the output of the inverter 108 is HL as described above so that in the same way as in the above described case, in response to the HL output of the latch circuits 86 and 87, the output of the AND gates 160 and 109 is HL. Thus, also in this case, the aperture value setting resistances 117 and 118 are connected in parallel to the resistance 120. Further, in this case as described above also the output of the latch circuit 85 is HL so that the transistor 113 is also inverted into the conductive state, while the resistance 116 is connected in parallel to the resistance 120.

Consequently, the amplifier 123 delivers a voltage corresponding to the aperture value F3 determined by the voltage dividing ratio of the voltage dividing circuit 116-120 to the camera side via the terminal b. Also in this case, the LED 104 is not lit. Further, because the output of the latch circuit 85-87 is HL, the light measuring circuit of the light adjusting circuit is in a position to select the aperture value of F3 as described above.

Further, when the object distance is shorter than d0 in FIG. 2(b) beyond the possible range of the light adjusting, as described above, the output of the comparator 153 is HL so that the output of the latch circuit 151 is HL and the transistor 156 is conductive so as to bring the terminal b to ground potential via the amplifiers 121 and 123. When the terminal b is OV, as described above, the diaphragm of the camera is set at the largest F value such as F16 or F22.

When the shutter release button is depressed down to the position of the first stroke as described above, the preliminary flash light emission is carried out, and the operation for setting the diaphragm of the photographing lens and the light adjusting level of the speed light device takes place.

When after then the shutter release button is depressed down to the position of the second stroke, as described above the mirror (not shown in the drawing) is raised up, while the diaphragm of the photographing lens (not shown in the drawing) is determined according to the aperture value information predetermined by the above described preliminary flash light emission. After these operations and the conventional operation to be described later, the shutter (not shown in the drawing) is totally opened and the synchronization contact (FIG. 4 SWg) is operated, when the synchronization terminal is grounded, the AND gate 132 is inverted into HL, the one shot circuit 131 is triggered so as to produce an HL signal during the time necessary for the flash light photographing for example 5-6 μs. Thus, in synchronization with the falling down of the signal from the one shot circuit 130, the so far conductive transistor 68 is again inverted into the non-conductive state and the light measuring circuit of the light adjusting circuit is inverted into the operative state. Further, the signal from the above one shot circuit 131 triggers the trigger circuit 10 so that the electrical energy is supplied from the main capacitor 9 to the main discharge tube 13 by the conventional way so that the discharge tube 13 emits a flash light for illuminating the object. When, in this way, the main flash light is emitted and reflected from the object to the photo transistor 23, the capacitor 57 in the light measuring circuit for the distance measurement and the capacitor selected according to the object distance at the time of the preliminary flash light emission start to be charged. When then the charge level of these capacitors reaches a certain determined level, the comparator 73 is inverted into HL and the output of the AND gate 81 is inverted into HL so that the thyristor 19 is triggered, whereby, by the conventional way, the main flash light emission is interrupted so as to carry out the flash light photographing under the proper exposure.

Below, the single lens reflex camera to be used for the flash light photographing device shown in FIGS. 1 to 3 will be explained with reference to FIGS. 4 and 5.

Figure 4:
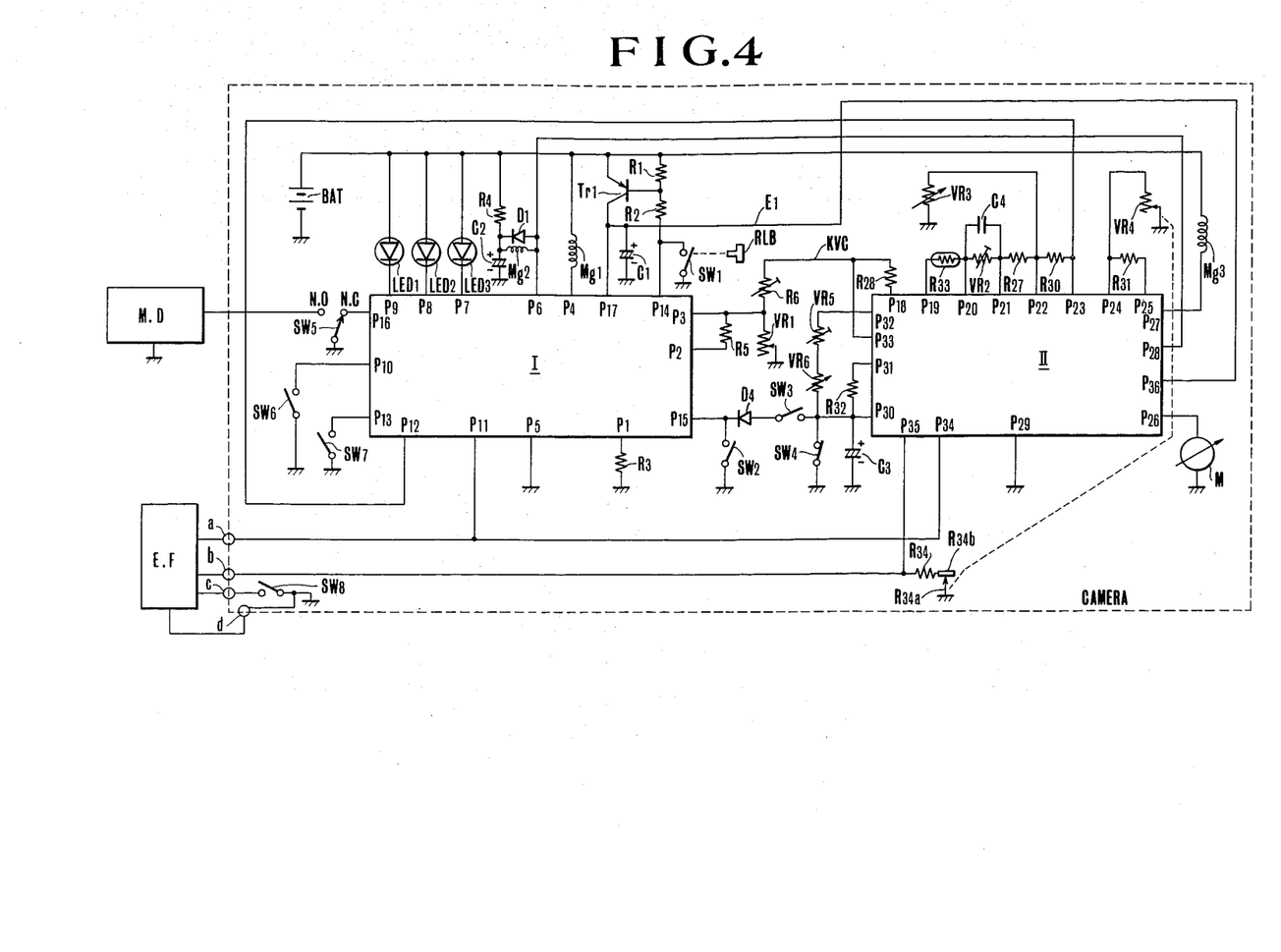
FIGS. 4 and 5 respectively show the circuit of an embodiment of the single lens reflex camera in the above flash photographing device.

FIG. 4 shows the block diagram of the electrical circuit of the above camera, whereby the part in the dotted line is the part built in the camera body. In the drawing MD is the motor drive device and FF the speed light device explained with reference to FIGS. 1 to 3. Further, the terminals a, b, c and d are those shown in FIG. 1. In FIG. 4, I is the integrated circuit (LSI) constituting the sequence control part and the automatic exposure control part and P1-P17 the input and the output terminals to the integrated circuit II and the terminals for other parts. II is the integrated circuit (LSI) constituting the light measuring part, the calculating circuit and the time control part and P18-P36 the input and the output terminals and the terminals for other parts. M is the information display meter; Mg1, Mg2, Mg3 are the magnets, Tr1 is the transistor for the circuit for holding the current supply from the power source BAT; LED1-LED3 are the display ight emitting diodes; SW1-SW7 are the switches; VR1-VR7 the information setting and other variable resistances and BAT is the power source battery.

In the drawing, SW1 is the switch to be closed when the shutter release button RLB is depressed down to the position of the first stroke, SW2 is the switch to be closed when the shutter release button RLB is depressed to the position of the second stroke, SW3 is the switch to be closed at the time of the bulb exposure, SW4 is the count switch to be opened when the shutter is fully opened and SW6 is manual change over switch between the automatic and the manual photographing and closed at the time of the manual mode. SW7 is the self-timer photographing switch to be closed when the timer is in use. SW5 is the change over switch for carrying out the winding and the photographing when the motor drive device MD is used, and changed over to the N.C side when the film has been wound up and to the N.D side when the tail shutter curtain has run. SW8 is the switch for triggering the EF and closed when the not shown leading shutter curtain has run. Mg1 is the automatic exposure control magnet, Mg2 the camera operation starting magnet and Mg3 the shutter time control magnet.

In the case of the camera in FIG. 4, the circuit element II carried out the light measurement, the calculation and the time control in an analog way and the circuit element I carried out the diaphragm control for the automatic exposure and the sequence control for various photographing mode in a digital way. These operations have been disclosed in the patent publication No. Sho 52-50722 so that here only the integrated circuit relating to the present invention will be explained.

FIG. 5 shows the circuit II in FIG. 4. In the drawing, 301 is the constant voltage source for producing a constant voltage; AR9 is the operational amplifier to whose non-inverting input terminal the output of the above constant voltage source is connected, between whose inverting input terminal and the output terminal the feed back resistance R13 is connected and whose inverting input terminal is connected to the terminal a at the camera side. The potential at the non-inverting input terminal is equal to that at the inverting input terminal and the above constant voltage is delivered from the terminal a. CP4 and CP5 are the comparators whose negative input terminal (−) is connected to the output terminal of the above amplifier AR9 via a resistance and whose positive input terminal (+) is connected to the inverting input terminal of the above amplifier AR9, whereby the circuit in the dotted line serves to change over the shutter time in response to the shutter time change over signal sent from the terminal a of EF in FIG. 1 at the time of the flash light photographing as to control the AR5 and the switch 302. AR6 is the variable resistance for showing the resistance value corresponding to the preset shutter time in operative engagement of the shutter dial; R32 is the fixed resistance as the shutter time information source for the flash light photographing; C5 is the condenser for constituting the time constant circuit with the resistance VR6; SW4 is the count switch to be opened in operative engagement with the start of the leading shutter curtain; CP6 is the comparator to whose negative input terminal (−) the standard voltage is applied via the resistances R26 and R27 and those positive input terminal (+) is connected to the output terminal of the time constant circuit and Mg3 the tail shutter curtain holding magnet. These circuit elements constitute the shutter time control circuit. The above change over circuit 302 is connected to the variable resistance VR6 or R32 constituting the shutter time control circuit so as to connect the resistance R32 to the condenser C5 in response to the LL output of the comparator CP5 and the variable resistance VR6 to the condenser C5 in response to the HL output of the comparator CP5.

AR8 is the operational amplifier whose non-inverting input terminal is connected to the inverting input terminal of the above amplifier AR9, whose inverting input terminal is grounded via the resistance R14 and in whose feed back circuit the resistance R15 is connected so as to constitute the amplifier for making the above constant voltage K time as high. SPD is the silicone photo diode and AR2 is the operational amplifier between whose input terminals the silicone photo diode is connected and in whose feed back circuit the logarithmic compression diode is connected so as to constitute the light measuring circuit. AR1 is the operational amplifier between whose input terminals the diode D2 is connected and whose output terminal is connected to the non-inverting input terminal of the above amplifier. R33 is the posister connected to the output terminal of the light measuring circuit, whereby the posister and the amplifier AR1 constitute the temperature compensating circuit of the light measuring circuit. AR3 is the operational amplifier between those inverting input terminal and output terminal the variable resistance VR2 and the condenser are connected in parallel, constituting the circuit for compensating the flicker contained in the light measuring output. VR3 is the variable resistance on which the preset shutter time and the film sensitivity information are set and AR5 is the operational amplifier having the first and the second inverting input terminal, whereby the first inverting input terminal is connected to the variable resistance VR2 and the amplifier VR3, while the second inverting input terminal is connected to the terminal b. The amplifier constitutes the calculation circuit which carries out the calculation (for the daylight) of the information delivered to the first input terminal in response to the HL output from the comparator CP4 and the calculation (for the flash light) of the information delivered to the second input terminal in response to the LL output. VR4 is the variable resistance on which the information of the smallest F value of the photographing lens is set and its resistance value varies according to the smallest aperture value information by means of the information transmission pin of the not shown lens. VR6 is the operational amplifier which is connected to the variable resistance VR4 and in whose feed back circuit the resistance R31 is connected, constituting a smallest aperture value forming circuit for forming the voltage corresponding to the smallest aperture value. AR7 is the operational amplifier for calculating the output of the above amplifiers AR5 and AR6 and M the display meter. R34 is the resistance having the impedance relative to the information of the smallest aperture value F of the photographing lens; R34b is the fixed contact of the resistance and R34a is the movable control in operative engagement of the variable resistance VR4. The variable resistance is connected to the contact R34b when the smallest aperture value is below $F_{AVO}$ between F1 and F2 in FIGS. 2(a) and (b) so as to satisfy the relation $$z < \frac{R2 - R3}{R1}$$

and open the contact R34b when the smallest aperture value is above the value so as to satisfy the relative $$z > \frac{R2 - R3}{R1}$$

in order to transmit the information of the smallest aperture value information FNo. as the impedance value.

Below, the operation of the circuit in FIGS. 4 and 5 will be explained. When the shutter release button RLB(FIG. 4) is depressed, the switch SW1 is closed and the transistor (FIG. 4) is closed, whereby the current supply state is established via the current supply holding circuit. Further, at the time of the flash light photographing, the speed light device in FIGS. 1 -3 carries out the preliminary flash light emission when the current supply is started. Along with the above start of the current supply, the light sensing photo voltaic element SPD (FIG. 5) sensing the light through the not shown photographing lens from the object produces the photo current corresponding to the brightness of the object. This signal is amplified by the operational amplifier AR2 having the logarithmic element D3 in the feed back circuit so as to produce the brightness information (BV) at the output. In order to compensate the charge of the logarithmic diode D3, the operational amplifier AR1 having the same characteristics as that of D2 is provided in the feed back circuit and the posister R33 at the output side. Further, the output of AR2 is delivered to the operational amplifier AR3 via the posister R33, whereby the higher harmonics of the input signal is attenuated by the characteristics of C4 and VR2 in the amplifier so as to eliminate the fluctuation of the output due to the above flicker. The brightness information (BV) from the AR3 is delivered to the inverting input terminal of the operational amplifier AR5 via the resistance R29. To the terminal of AR5 the shutter time information (TV) and the film sensitivity information (SV) which are set on the variable resistance VR3 are delivered so as to be calculated. Thus, the diaphragm step number information $V_{\Delta Av}$ appears at the output of AR5, taken out from the terminal P23 and delivered to the sequence control and the automatic exposure control circuit I as is shown in FIG. 4. Further, the diaphragm step number information V∆Av is compared with the smallest F value information (AVO) of the lens set on VR4 so as to produce the information (AV) corresponding to the aperture value at the output, which information is displayed by the aperture value display meter M for example in the view finder. When the shutter release button is depressed down to the position of the second stroke, as is described in detail in the patent publication No. Sho 52-50722, the magnet Mg2 for starting the camera is excited, whereby the signal is delivered to the comparator CP6 via the terminal P28 so as to control CP6, while by the output of P27 the magnet Mg3 is excited so as to hold the tail shutter curtain. When the shutter starts, in operative engagement of the start of the leading shutter curtain, the switch SW4 is opened and the capacitor C5 starts to be charged via the resistances VR5 and VR6 of the time constant circuit. The terminal voltage of the above capacitor C5 is applied to the non-inverting input of the comparator CP6, whereby this signal and the voltage of the change over circuit 302 is divided by the resistances R26 and R27 in such a manner that the divided voltage is compared with the standard voltage in CP6 and, when they coincide, CP is inverted so as to demagnetize Mg2 and allow the tail shutter curtain to start to run. In this way, the photographing is finished and the tail shutter curtain is controlled, when the change over switch SW5 in FIG. 5 is changed over to the N.O side and the circuit is reset.

Below, the flash light mode will be explained when the speed light device EF in FIG. 1 becomes ready for emitting the flash light, namely the charge amount of the main capacitor 9 reaches a certain determined amount, the output of the comparator 50 becomes HL as described above and the transistor 41 is brought in the closed state so that, seen from the camera side, the resistance 56 is connected between the terminal a and the ground so that the current flows from the camera side via the terminal a.

Consequently, when the speed light device is not connected or not yet in the ready state for emitting the flash light, no current from the terminal a at the camera side to the speed light device, the output of the operational amplifier AR9 in FIG. 5 has the same voltage as that of the constant voltage source 301. However, when the speed light device becomes ready for emitting the flash light, the transistor 41 in FIG. 1 is closed and the current basing upon the constant voltage flows in from the terminal a via the resistance 56. The current 9 (=$V_{CT}$/R56) flows through the terminal a ($V_{CT}$: the constant voltage delivered from the camera side to the terminal a with the first stroke operation, R56: the value of the resistance 56).

Then, this current value is detected by the detecting circuit at the camera side so as to change over the camera mode out of the daylight mode into the flash light mode. Namely, when the above current i=$V_{CT}$/R56 flows in the terminal a in FIG. 1 via the terminal a in FIG. 5, the output voltage of the amplifier AR9 is inverted by i multiplied by the resistance value and the comparator CP4 and CP5 deliver the LL outputs. Thus, the amplifier AR5 is changed over into the flash light calculation mode, while the change over circuit 302 connects the resistance R32 to the condenser C5 so as to form the flash light time circuit. When the amplifier AR5 is changed over to the flash light mode the feed back resistance is changed over to the resistance R22. Consequently, at the time of the flash light photographing, the voltage corresponding to the aperture value appointed by the object distance is applied to the resistance 20 via the terminal b of the speed light device EF and calculated by the resistances 21 and 22 in the amplifier AR5, which delivers the diaphragm step number A∆Av for the flash light photographing. Further, the output of AR5 and AR6 is calculated by the resistances R23-R25 and the amplifier AR7 and the meter M displays the aperture value information applied from the speed light device to the terminal b. Consequently, the diaphragm of the camera is controlled by the diaphragm step number information V∆Av, while as described above the flash light photographing shutter time is controlled so as to carry out the flash light photographing.

As described above in accordance with the present invention, the over exposure which occurs when the object is at the short distance beyond the possible range of the light adjusting of the speed light device can be avoided by setting the diaphragm of the photographing lens at the largest aperture value, while the under exposure occurring when the object is at the long distance beyond the possible range of the light adjusting of the speed light device by setting the diaphragm of the photographing lens at the smallest aperture value.

What we claim:
1. A flash device usable with a camera having a diaphragm control circuit for controlling the diaphragm based upon an aperture signal, comprising:
 (a) flash emitting means for producing a preliminary light prior to making of an exposure and a main light when the exposure is made;
 (b) aperture signal forming means receptive of said preliminary light after reflection from an object to be photographed for producing an aperture signal corresponding to said reflected light, said aperture forming means sensing said reflected light while holding its sensing state at a predetermined constant state, during the emission of the preliminary light;
 (c) a light adjusting circuit receptive of said main light after reflection from said object and responsive to attainment by said reflected light of a predetermined value for stopping emission of the main light;
 (d) said aperture signal forming means further including a limit circuit responsive to detection of the fact that said aperture signal represents an aperture outside a range of cooperation for producing an aperture signal representing a limit aperture; and
 (e) adjusting means for adjusting the sensing operation of said light adjusting circuit in accordance with the aperture signal produced from said aperture signal forming means and upon production of said aperture signal from said limit circuit for adjusting the sensing operation of said light adjusting circuit in accordance with a predetermined limit value independently of the aperture signal.
2. A flash device which can be used with a camera having a diaphragm control device for controlling the diaphragm based upon an aperture signal comprising:
 (a) flash emitting means for emitting a preliminary flash and a main flash;
 (b) a light measuring circuit for sensing the light of the preliminary flash reflected from the object, said circuit receiving said light without causing the sensing state of said light to change during the emission of the preliminary light;

(c) an aperture signal forming circuit for forming the aperture signal according to the quantity of the reflected light sensed by the light measuring circuit, said circuit forming a certain predetermined aperture signal for setting the diaphragm at the largest aperture value when the sensed light quantity is higher than a certain predetermined level;

(d) a light adjusting circuit for stopping the emission of the main flash when the sensed quantity of light of the main flash reflected from the object reaches a certain predetermined light adjusting level; and (e) light adjusting level setting means for setting the light adjusting level of the light adjusting circuit at the level according to light amount sensed by the light measuring circuit, said means setting the liquid adjusting level at a certain predetermined limit level independently of said level according to the light amount sensed by the light measuring circuit when the light amount sensed by the light measuring circuit is higher than said certain predetermined level.

3. A flash device which can be used with a camera having a diaphragm control device for controlling the diaphragm based upon an aperture signal comprising:

(a) flash emitting means for emitting a preliminary flash and a main flash;

(b) a light measuring circuit for sensing the light of the preliminary flash reflected from the object, said circuit receiving said light without causing the sensing state of said light to change during the emission of said preliminary flash;

(c) an aperture signal forming circuit for forming the aperture signal according to the quantity of the reflected light sensed by the light measuring circuit, said circuit forming a certain predetermined aperture signal for setting the diaphragm at the smallest aperture value when the sensed light quantity is lower than a certain predetermined level;

(d) a light adjusting circuit for stopping the emission of the main flash when the sensed light quantity of the main flash reflected from the object reaches a certain predetermined light adjusting level; and (e) light adjusting level setting means for setting the light adjusting level of the light adjusting circuit at a level according to the light quantity sensed by the light measuring circuit, said means setting the light adjusting level at a certain predetermined limit level independently of said level according to the light quantity sensed by the light measuring circuit when the light quantity sensed by the light measuring circuit is lower than said certain predetermined level.

4. A flash device according to claim 2 or 3, wherein the light emitting means has first means for emitting the preliminary flash and second means for emitting the main flash.

5. A flash device according to claim 2 or 3, wherein the light measuring circuit serves at the same time as the light adjusting circuit.

6. A flash device according to claim 2 or 3, wherein the light emitting means has first means for emitting the preliminary flash and second means for emitting the main flash, whereby the light measuring circuit serves at the same time as the light adjusting circuit.

7. A camera system comprising:

(a) a camera including:

(1) a diaphragm adjusting circuit for adjusting a diaphragm according to an aperture signal from a flash device; and (b) a flash device including:

(1) flash emitting means for producing a preliminary light prior to making of an exposure and a main light when the exposure is made;

(2) aperture signal forming means receptive of said preliminary light after reflection from an object to be photographed for producing an aperture signal corresponding to said reflected light, said aperture forming means sensing said reflected light while holding its sensing state at a predetermined constant state, during the emission of the preliminary light;

(3) a light adjusting circuit receptive of said main light after reflection from said object and responsive to attainment by said reflected light of a predetermined value for stopping emission of the main light;

(4) said aperture signal forming means further including a limit circuit responsive to detection of the fact that said aperture signal represents an aperture outside a range of cooperation for producing an aperture signal representing a limit aperture; and (5) adjusting means for adjusting the sensing operation of said light adjusting circuit in accordance with the aperture signal produced from said aperture signal forming means and upon production of said aperture signal from said limit circuit for adjusting the sensing operation of said light adjusting circuit in accordance with a predetermined limit value independently of the aperture signal.

8. A flash device usable with a camera having a diaphragm control cirucit for controlling the diaphragm based upon an aperture signal, comprising:

(a) flash emitting means for producing a preliminary light prior to making of an exposure and a main light when the exposure is made;

(b) an integration circuit for receiving the reflected light from an object to be photographed with said preliminary light illumination and integrating said received reflected light;

(c) a plurality of aperture signal forming means for producing an aperture signal of respective different predetermined values, said forming means including a means for producing an aperture signal representing a limit value;

(d) a selection circuit receptive of the output of said integration circuit for selecting one of said aperture signal forming means, whereby when the output of said integration circuit lies in a predetermined range of levels, said selection circuit selects one of said aperture signal means which corresponds to the output level, and when the output of said integration circuit is outside said range of levels, one of said aperture signal means which produces the aperture signal representing said limit value value with no relation to its level;

(e) a light adjusting circuit receptive of the reflected light from the object with said main light illumination and responsive to attainment of said reflected light to a predetermined light adjusting level for stopping the emission of the main flash; and (f) a plurality of setting means for setting light adjusting levels for said light adjusting circuit, said means having different light adjusting level signals from one another corresponding to the aperture signals produced by said aperture signal means, whereby when the output of said integration sicuit lies in a predetermined range of levels, one of said setting means which corresponds to said selected aperture signal means is selected so that its light adjusting level is set to a value depending upon the selected aperture signal, and when the output of the integration circuit is outside said range, one of said setting means which produces the light adjusting level signal representing a maximum or minimum value is selected so that the light adjusting level is set to a value determined by said selected setting means regardless of the aperture signal representing the limit value.

9. A camera system comprising:
(a) a camera including:
(1) a diaphragm adjusting circuit for adjusting a diaphragm according to an aperture signal from a flash device; and
(b) a flash device including:
(1) flash emitting means for producing a preliminary light prior to making of an exposure and a main light when the exposure is made;
(2) an integration circuit for receiving the reflected light from an object to be photographed with said preliminary light illumination and integrating said received reflected light;

(c) a plurality of aperture signal forming means for producing an aperture signal of respective different predetermined values, said forming means including a means for producing an aperture signal representing a limit value;
(d) a selection circuit receptive of the output of said integration circuit for selecting one of said aperture signal forming means, whereby when the output of said integration circuit lies in a predetermined range of levels, said selection circuit selects one of said aperture signal means which corresponds to the output level, and when the output of said integration circuit is outside said range of levels, one of said aperture signal means which produces the aperture signal representing said limit value value with no relation to its level; integration circuit lies in a predetermined range of levels, one of said setting means which corresponds to said selected aperture signal means is selected so that its light adjusting level is set to a value depending upon the selected aperture signal, and when the output of the integration circuit is outside said range, one of said setting means which produces the light adjusting level signal representing a maximum or minimum value is selected so that the light adjusting level is set to a value determined by said selected setting means regardless of the aperture signal representing the limit value.

* * * * *